United States Patent Office 3,470,211
Patented Sept. 30, 1969

3,470,211
PHOTOCHROMIC DIHYDRODIBENZO-FURANS
AND THIOPHENES AND SYNTHESIS THEREOF
Joseph Csapilla, Stamford, Conn., assignor to American
Cyanamid Company, Stamford, Conn., a corporation
of Maine
No Drawing. Filed May 17, 1966, Ser. No. 550,629
Int. Cl. C07d 5/40, 63/18
U.S. Cl. 260—346.2     10 Claims

ABSTRACT OF THE DISCLOSURE

Photochromic dihydrodibenzo-furans and thiophenes
are provided having the formula

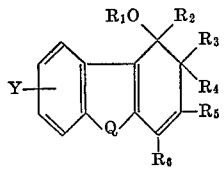

where $R_1$ is alkyl, $R_2$ and $R_6$ are alkyl, aryl or substituted aryl, $R_3$ and $R_4$ are cyano, carboxy, sulfonyl, sulfinyl, nitro or nitroso, $R_5$ is hydrogen, alkoxy, amino, or the same as $R_2$ or $R_3$, Q is oxygen or sulfur, and Y is hydrogen, alkyl, alkoxy, alkylthio, cyano, nitro, amino, halogen, trifluoromethyl or acyl. They are prepared by condensing the benzofurans or thiophenes of U.S. Patent No. 3,331,854 with ethylenes carrying the above-defined substituents $R_3$, $R_4$, and $R_5$, cyclizing the products in strongly acid media, and esterifying.

---

This invention relates to photochromic cyclohexadiene compounds of the formula

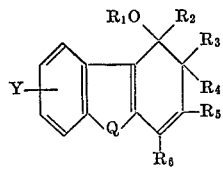

where Y is hydrogen, alkyl, alkoxy, alkylthio, cyano, nitro, amino, halogen, trifluoromethyl, or acyl; Q is oxygen or sulfur; $R_1$ is alkyl; $R_2$ and $R_6$ are alkyl, aryl, or substituted aryl wherein the substituents are alkyl, alkoxy, alkylthio, cyano, nitro, amino, halogen, or trifluoromethyl; $R_3$ and $R_4$ are cyano, carboxy, sulfonyl, sulfinyl, nitro, or nitroso; and $R_5$ is hydrogen, alkoxy, amino, or the same as $R_2$, $R_3$, $R_4$, or $R_6$.

The formula above includes compounds wherein Y, $R_1$, $R_2$, $R_5$ and $R_6$ may be the same (where indicated) or different as well as compounds containing substituted aryl groups wherein one or more substituents, same or different, are present. Preferred alkyl groups are lower alkyl ($C_1$–$C_8$) and preferred aryl groups are phenyl, naphthyl, and the like. Likewise, preferred alkoxy and alkylthio groups are lower alkoxy and lower alkylthio ($C_1$–$C_8$). Halogen includes chloro, bromo, iodo, and fluoro. Sulfonyl (—$SO_2$—$R_7$) and sulfinyl (—SO—$R_7$) includes any such groups wherein $R_7$ is alkyl or aryl. Amino in the definition of Y, $R_2$, $R_5$ and $R_6$ includes —$NH_2$, monoalkylamino or dialkylamino wherein the preferred alkyl is lower alkyl ($C_1$–$C_8$). Acyl includes (A) 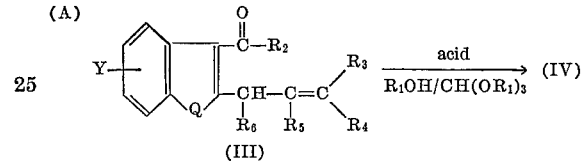

wherein $R_7$ is aliphatic (e.g., $C_1$–$C_8$), aromatic (e.g., phenyl, naphthyl, fluorophenyl) or hydrogen.

These compounds are prepared by cyclization of the corresponding intermediate (III) in a strongly acidic, substantially non-aqueous medium with an alcohol and/or orthoformate as follows (Equation A) wherein Y, Q, $R_1$, $R_2$, $R_3$, $R_4$, and $R_5$ are as defined above:

As alcohols may be mentioned the normal or branched chain aliphatic alcohols such as methanol, ethanol, propanol, butanol, pentanol, and the like. The normal ($C_1$–$C_8$) alcohols are preferred. The orthoformates include trimethyl orthoformate, triethyl orthoformate, and the like, whether normal or branched chain, but preferably the $C_1$–$C_8$ normal orthoformates.

Intermediate (III) is prepared in a known manner by reaction of a known benzo[b]furan or benzo[b]thiophene in a non-aqueous strongly basic medium with a known ethylene compound (II) as follows (Equation B) wherein Y, Q, $R_1$, $R_2$, $R_3$, $R_4$, and $R_5$ are as defined above and X is a leaving group, i.e., one which does not become a part of product (IV), e.g., halogen, alkoxy, phenoxy, sulfonoxy, cyano, and the like:

(B) 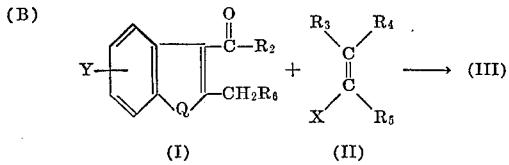

Typical strong bases are sodium hydride; sodium triphenylmethide; alkali metal alkoxides such as sodium methoxide, sodium ethoxide and potassium butoxide; alkali metal dialkyl amides such as lithium diethylamide and lithium dipropylamide; and the like. Suitable solvents useful as the non-aqueous reaction medium include tetrahydrofuran, dioxane, dimethyl sulfoxide, aliphatic alcohols, glyme, diglyme, and the like. The reactants are employed in stoichiometric amounts although an excess of the ethylene reactant (II) is preferred. Reflux conditions are preferred but are not critical.

Representative ethylene compounds (II) include the following:

tetracyanoethylene,
ethoxymethylenemalonitrile,
N-[1,2-dicyano-2-(4-tolysulfonyl)-vinyl]-4-chloraniline,
4-[1,2-dicyano-2-(4-tolylsulfonyl)-vinyl]-N,N-dimethylaniline,
1-benzyl-2-benzylsulfonyl-1,2-dicyanoethylene,
dicyanoketene diethyl acetal,
1,2-dicyano-1,2-bis-(n-butylsulfonyl)-ethylene,
1,2-dicyano-1,2-bis-(ethylsulfinyl)-ethylene,
diethyl ethoxymethylenemalonate,
1-carbethoxy-2-methoxy-1-nitroethylene, and
1-carbethoxy-2-ethoxy-1-nitrosoethylene.

The sarting benzo[b]furan and benzo[b]thiophene compounds (I) may be prepared in accordance with the procedure disclosed in U.S. Patent No. 3,331,854 of Kenneth Robert Huffman and Edwin Fisher Ullman.

In the preparation of the compounds (IV) of the present invention from intermediate (III) according to Equation A, intermediate (III) and an amount of a strong organic or inorganic acid sufficient to provide a strongly acidic medium are dissolved in a suitable non-aqueous solvent. To this solution is added one or both of the alcohol $R_1OH$ and orthoformate $CH(OR_1)_3$ in at least stoichiometric amounts. Reaction occurs readily at room temperature (about 25° C.) and is substantially complete in most cases in about 5 to 48 hours. Reaction temperature may range from about —45° C. to 150° C., preferably 0° C. to 60° C. or reflux temperature, but can be varied depending upon the pressure which may be atmospheric, sub-atmospheric or super-atmospheric. Best yields are obtained if a mixture of the orthoformate and alcohol is employed, particularly where the alcohol is in excess, e.g., 2–20 parts by volume of alcohol per part by volume of orthoformate.

The amount of acid to provide the strongly acidic medium is not critical and generally catalytic amounts, e.g., 0.1% to 1% by weight, are effective. Non-aqueous organic acids such as methane sulfonic, p-nitrotoluene sulfonic, p-toluene sulfonic, chlorotoluene sulfonic, and the like, are preferred although essentially anhydrous mineral acids such as hydrochloric, sulfuric, nitric, (in alcoholic medium if desired) and the like, may be employed.

The product cyclohexadiene (IV) is separated and purified in the conventional manner such as extraction with ether, crystallization, chromatography, and filtration.

The compounds of the invention may also be prepared by reaction of intermediate (III) with a diazoalkane such as diazomethane as illustrated in Equation C below:

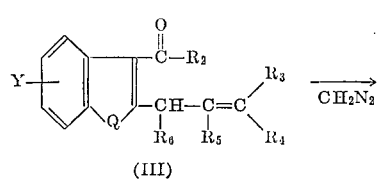

(III)

 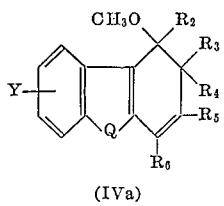

(IVa)

The diazomethane reactant alkylates intermediate (III) whereby $R_1$ becomes methyl. This procedure may be extended to include reaction with higher homologs ($C_1$–$C_8$) of diazomethane to form the corresponding photochromic compounds. A stoichiometric excess of the diazo compound is conveniently employed in a non-aqueous solvent such as diethylether, benzene, tetrahydrofuran, and the like, at from about —40° C. to room temperature, preferably —10° C. to 10° C. This method is less preferred than that of Equation A since extra precautions must be taken to avoid the hazards associated with use of the diazo reactant.

The compounds of the invention exhibit photochromism and are therefore useful in the manufacture of articles such as sunglasses, novelty toys and variable transmission devices such as windows, photocopying machines and materials, optical masks and the like. Coloration is induced conveniently by ultraviolet irradiation and it is thought that the colored form has the configuration of resonance forms (V) or (VI) as shown in Equation (D) below:

Photochromic films containing compounds of the invention are particularly useful embodiments. Typical films are prepared by dissolving the compound in a suitable solvent such as benzene and adding this solution to a thermoplastic polymer solution. A representativee composition is a 20% by weight solids mixture containing polymethylmethacrylate and photochromic compound (95% polymer to 5% photochromic compound). The composition is then spread on a suitable substrate such as polyester film and the solvent evaporated. The resulting article is useful as an optical mask, memory tape or sunvisor.

The following examples further illustrate the invention but are not limitative thereof. All parts and percentages are by weight unless otherwise specified.

EXAMPLE 1

(A) Preparation of 3-[3-(o-methoxybenzoyl)-2-benzofuranyl]-3-phenyl-1-propene-1,1-dicarbonitrile (III)

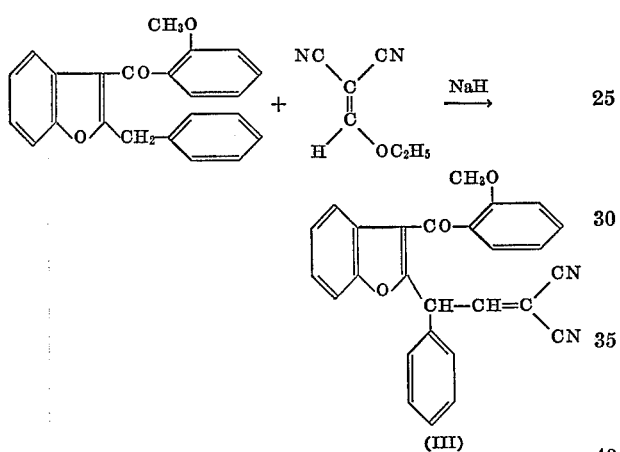

(III)

To 1.0 gram of sodium hydride (55% in mineral oil), stirred in 10 milliliters of dry tetrahydrofuran, is added dropwise a solution of 0.0100 mole (3.42 grams) of 3-(o-methoxybenzoyl)-2-benzylbenzofuran in 20 milliliters of dry tetrahydrofuran. Excess sodium hydride has no effect on the reaction. Sodium hydride, sodium amide, butyl lithium, sodium methoxide, potassium tertiary-butoxide, and the like can also be employed as bases. The entire reaction mixture is kept under a nitrogen atmosphere. The resulting deep red solution is refluxed for 30 minutes (salt-formation is complete after a few minutes of refluxing), cooled to 0° C., then treated with 0.011 mole (1.35 grams) of ethoxymethylenemalonitrile, and kept at 0° C. for 15 minutes. Two milliliters of glacial acetic acid are added dropwise to destroy the excess sodium hydride. The sodium hydride can also be destroyed by other hydroxylic solvents such as water, alcohols and organic acids. Thereafter, about ⅔ of the solvent is removed on a steam bath while nitrogen is bubbled through the reaction mixture. The residue is taken up in aqueous sodium carbonate solution and ether. The ether extract contains the unreacted starting materials, the mineral oil and the non-acidic by-products. The alkaline solution is separated and acidified with 2 N HCl and then extracted with methylene chloride. The oily residue (3.7 grams; 89%) is purified by chromatography on silica gel. The proposed structure is consistent with the infrared spectrum of the purified sample.

(B) Preparation of 1-methoxy-1-(o-methoxyphenyl)-4-phenyl-2,2(1H)-dibenzofurandicarbonitrile

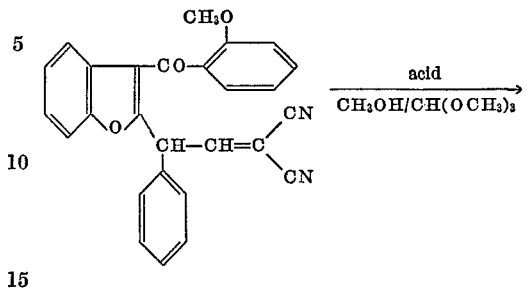

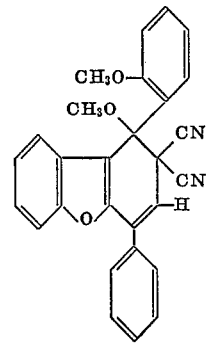

The benzofuran product (III) of Part (A) (0.95 gram), purified by chromatography on silica gel, and 0.10 gram of p-toluenesulfonic acid is dissolved in 5 milliliters of methanol and 0.5 milliliter of trimethyl orthoformate. The mixture is allowed to stand at ambient temperature for two days, then at 0° C. for 3 days. The crystalline product is filtered and washed with methanol to give 0.63 gram (69%) of white crystals. These are recrystallized from methylene chloride/methanol, M.P. 180° C. (decomposition).

EXAMPLE 2

Following the procedure of Example 1, except for use of 3-(2,4-dimethoxybenzoyl)-2-benzylbenzofuran as the starting compound in Part (A), there is prepared 1-methoxy-1-(2,4-dimethoxyphenyl) - 4 - phenyl-2,2(1H)-dibenzofurandicarbonitrile, M.P. 225° C. (decomposition).

EXAMPLE 3

Following the procedure of Example 1, except for use of 3-(o-fluoro benzoyl)-2-benzylbenzofuran as the starting compound of Part (A), there is prepared 1-methoxy-1-(o-fluorophenyl)-4-phenyl - 2,2(1H) - dibenzofurandicarbonitrile, M.P. 153° C. (decomposition).

EXAMPLE 4

The product of Example 1 is prepared by an alternative procedure as follows. The intermediate of Example 1, Part (A), is dissolved in diethylether and treated with a molar excess of diazomethane, also dissolved in diethylether, at 0° C. The product, based on infrared and nuclear magnetic resonance spectra, is identical with the product of Example 1, Part (B): 1-methoxy-1-(o-methoxyphenyl)-4-phenyl - 2,2(1H) - dibenzofurandicarbonitrile. The compound exhibits maximum absorption at 335 millimicrons (activating wavelength) and 495 millimicrons (activated species in polyvinylchloride film). Photochromic sensitivity, measured as the product of the extinction coefficient and quantum efficiency, Φ E, is 17,500 in benzene.

EXAMPLES 5–50

Table I below further illustrates the process and compounds of the invention.

TABLE I

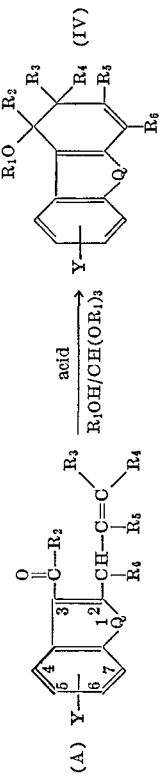

| Example | Y | Q | R₁ | R₂ | R₃ | R₄ | R₅ | R₆ |
|---|---|---|---|---|---|---|---|---|
| 5 | H | O | Methyl | 2,3-dimethoxyphenyl | Cyano | Cyano | H | Phenyl. |
| 6 | H | O | do | m-Fluorophenyl | do | do | H | Do. |
| 7 | H | O | do | 2,4-dimethoxyphenyl | do | do | H | p-Chlorophenyl. |
| 8 | H | O | do | o-Methoxyphenyl | do | do | H | p-Cyanophenyl. |
| 9 | H | O | do | 2,5-dimethoxyphenyl | do | do | H | Phenyl. |
| 10 | H | O | do | p-Methoxyphenyl | do | do | H | Do. |
| 11 | H | O | do | p-Fluorophenyl | do | do | H | Do. |
| 12 | H | O | Ethyl | p-Methoxyphenyl | do | do | H | Do. |
| 13 | H | O | Methyl | o-Methoxyphenyl | do | do | Ethyl | Do. |
| 14 | 6-Br | O | do | do | do | do | Methyl | Do. |
| 15 | 6-C₆H₅ | O | do | do | do | do | H | p-Trifluoro-methylphenyl. |
| 16 | 4-CN | O | do | do | do | do | H | p-Nitrophenyl. |
| 17 | 6-SCH₃ | O | Ethyl | m-Bromophenyl | do | do | H | Phenyl. |
| 18 | H | S | do | o-Cyanophenyl | do | do | p-Dimethylaminophenyl | p-Dimethylaminophenyl. |
| 19 | H | S | do | o-Methoxyphenyl | do | do | H | Phenyl. |
| 20 | H | O | do | do | do | do | H | m-Bromophenyl. |
| 21 | H | O | do | p-Fluorophenyl | do | do | H | Phenyl. |
| 22 | 5-NO₂ | O | do | p-Dimethylaminophenyl | do | do | H | Do. |
| 23 | 6-CF₃ | S | do | o-Methoxyphenyl | do | do | Phenyl | p-Cyanophenyl. |
| 24 | 5-NH₂ | S | do | do | do | do | Methyl | Phenyl. |
| 25 | 4-OCH₃ | O | do | do | do | do | H | Do. |
| 26 | 4-OCH₃ | S | do | p-Tolyl | do | do | Cyano | Do. |
| 27 | 4-C₆H₅ | O | do | o-Methylthiophenyl | do | do | H | Do. |
| 28 | 4-(CH₃)₂N— | S | do | do | do | do | Ethyl | Do. |
| 29 | 4-CH₃C₆H₄— | O | do | p-Cyanophenyl | do | Phenyl-sulfonyl | Ethoxy | Do. |
| 30 | H | O | Methyl | o-Methoxyphenyl | do | Tosyl | do | Do. |
| 31 | H | S | Ethyl | do | do | Phenyl-sulfonyl | Cyano | Do. |
| 32 | H | O | Methyl | Phenyl | do | do | do | p-Methoxyphenyl. |
| 33 | H | O | do | do | do | Cyano | p-Dimethyl-aminophenyl | Phenyl. |
| 34 | H | O | Ethyl | o-Fluorophenyl | do | do | H | Do. |
| 35 | 5-benzoyl | O | do | 2,4-dimethoxyphenyl | do | do | H | p-Cyanophenyl. |
| 36 | 5-benzoyl | S | Methyl | p-Dimethylaminophenyl | do | do | H | Do. |
| 37 | H | O | do | m-Tolyl | do | do | H | Phenyl. |
| 38 | H | O | Ethyl | o-Methoxyphenyl | do | do | H | Do. |
| 39 | 5-(o-fluoro-enzoyl) | S | Methyl | o-Cyanophenyl | do | do | H | p-Dimethylaminophenyl. |
| 40 | 5-NO₂ | S | Ethyl | 2,4-dimethoxyphenyl | do | do | Ethoxy | Phenyl. |
| 41 | 6-CN | O | Methyl | o-Fluorophenyl | do | do | H | p-Methoxyphenyl. |
| 42 | H | O | Ethyl | 2,4-dimethoxyphenyl | do | do | Ethoxy | Do. |
| 43 | H | O | Methyl | 2,4-dimethoxyphenyl | Phenylsulfonyl | do | H | p-Fluorophenyl. |
| 44 | 5-benzoyl | O | Ethyl | o-Fluorophenyl | Cyano | do | Cyano | p-Fluorophenyl. |
| 45 | H | S | Methyl | do | do | do | Ethoxy | Phenyl. |

I claim:
1. Photochromic compounds of the formula

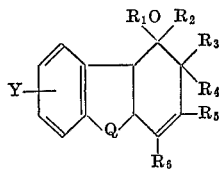

where
- Y is hydrogen, alkyl of 1 to 8 carbon atoms, lower alkoxy, alkylthio of 1 to 8 carbon atoms, cyano, nitro, amino, halogen, trifluoromethyl, alkanoyl of 1 to 9 carbon atoms, benzoyl or naphthoyl,
- Q is oxygen or sulfur,
- $R_2$ is alkyl of 1 to 8 carbon atoms,
- $R_2$ and $R_6$ are phenyl or naphthyl or monosubstituted phenyl or naphthyl wherein the substituent is alkyl of 1 to 8 carbon atoms, lower alkoxy, alkylthio of 1 to 8 carbon atoms, cyano, nitro, amino, halogen or trifluoromethyl,
- $R_3$ and $R_4$ are cyano, carboxy, nitro, nitroso, or —$SO.R_7$ or —$SO_2.R_7$ wherein $R_7$ is phenyl, tolyl or alkyl of 1–4 carbon atoms and
- $R_5$ is hydrogen, alkoxy, amino, cyano, carboxy, or the same as $R_6$.

2. Compounds according to claim 1 having the formula

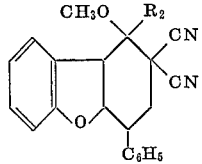

wherein $R_2$ is as defined in claim 1.

3. The compound of claim 2 wherein $R_2$ is o-methoxyphenyl.

4. The compound of claim 2 wherein $R_2$ is o-fluorophenyl.

5. The compound of claim 2 wherein $R_2$ is 2,4-dimethoxyphenyl.

6. A process for preparing the photochromic compounds of claim 1 which comprises reacting in a strongly acidic, substantially non-aqueous medium a compound of the formula

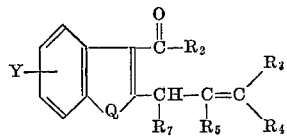

with $R_1OH$, $CH(OR_1)_3$, or a mixture of both, wherein Y, Q, $R_1$, $R_2$, $R_3$, $R_4$, $R_5$ and $R_6$ are as defined in claim 1.

7. The process of claim 6 wherein the acid is p-toluenesulfonic acid or methane sulfonic acid.

8. The process of claim 6 wherein a mixture of $R_1OH$ and $CH(OR_1)_3$ is employed, wherein $R_1$ is —$CH_3$.

9. A process for preparing the photochromic compounds of claim 1 which comprises reacting, in a substantially non-aqueous medium, a lower diazoalkane with a compound of the formula

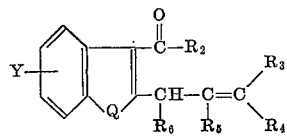

$R_2$, $R_3$, $R_4$, $R_5$ and $R_6$ being as defined in claim 1.

10. The process of claim 9 wherein said diazoalkane is diazomethane.

References Cited

UNITED STATES PATENTS 3,331,854   7/1967   Huffman et al. _____ 260—330.5

ALEX MAZEL, Primary Examiner

B. I. DENTZ, Assistant Examiner

U.S. Cl. X.R.

96—89; 117—333; 252—300; 260—330.5

PO-1050
(5/69)

UNITED STATES PATENT OFFICE
CERTIFICATE OF CORRECTION

Patent No. 3,470,211      Dated September 30, 1969

Inventor(s) Joseph Csapilla

It is certified that error appears in the above-identified patent and that said Letters Patent are hereby corrected as shown below:

Column 2, line 16, after "includes" insert the formula
$$-- R_7\overset{O}{C}- --$$
and lines 34 and 35 should directly follow this formula, as shown on page 1 of the specification as originally filed; the formula "(A)" in lines 22 to 28 should be inserted below on line 40 to follow "above:".

Column 9, line 16, change "$R_2$" to -- $R_1$ -- as shown in Claim 12 in the amendment dated February 27, 1967.

Column 10, line 10, change "$R_7$" to -- $R_6$ -- as shown in Claim 6 of the claims as originally filed.

SIGNED AND
SEALED
AUG 25 1970

(SEAL)
Attest:

Edward M. Fletcher, Jr.
Attesting Officer

WILLIAM E. SCHUYLER, JR.
Commissioner of Patents